United States Patent [19]

Yanase et al.

[11] Patent Number: 5,342,275
[45] Date of Patent: Aug. 30, 1994

[54] TOOL BREAKAGE DETECTING METHOD

[75] Inventors: Shugo Yanase, Nagoya; Haruki Baba, Iwakura, both of Japan

[73] Assignee: Brother Kogyo Kabushiki Kaisha, Nagoya, Japan

[21] Appl. No.: 35,059

[22] Filed: Mar. 22, 1993

[30] Foreign Application Priority Data

May 2, 1992 [JP] Japan ................... 4-140073

[51] Int. Cl.⁵ .................................. B23Q 3/157
[52] U.S. Cl. .................................. 483/1; 408/6; 409/134; 483/10
[58] Field of Search .............. 483/1, 2, 10, 47, 7, 483/12, 30, 8; 408/6, 16; 33/628, 556, 557; 409/218, 194, 187, 134; 364/474.21

[56] References Cited

U.S. PATENT DOCUMENTS

| | | | |
|---|---|---|---|
| 3,669,557 | 6/1972 | Mitchell | 408/16 |
| 3,870,430 | 3/1975 | Guenot | 408/6 |
| 4,571,841 | 2/1986 | Campbell | 33/628 |
| 4,592,146 | 6/1986 | Campbell | 33/556 X |
| 4,718,175 | 1/1988 | Babel | 408/6 X |
| 4,752,885 | 6/1988 | Kawakami et al. | 483/8 |
| 4,835,838 | 6/1989 | Hirose | 483/47 |

FOREIGN PATENT DOCUMENTS

| | | | |
|---|---|---|---|
| 52-34075 | 9/1977 | Japan . | |
| 144641 | 9/1982 | Japan | 483/1 |

*Primary Examiner*—William Briggs
*Attorney, Agent, or Firm*—Oliff & Berridge

[57] ABSTRACT

A breakage detecting device is mounted so that the position of the breakage detecting device in a direction parallel to an axial moving path of a spindle is unchanged. The breakage detecting device has a sensing element movable through a path that intersects the axial moving path of the spindle. If the sensing element comes into contact with a tip portion of a tool held by the spindle during the movement of the sensing element, it is judged that the tool held by the spindle has not been broken. Conversely, if the sensing element does not contact the tool, it is judged that the tool has been broken.

16 Claims, 12 Drawing Sheets

TOOL BREAKAGE DETECTING METHOD

BACKGROUND OF THE INVENTION

1. Field of the Invention

The invention relates to a method of detecting breakage of a tool and, more particularly, to such a method as to quickly detect the breakage.

2. Description of the Related Art

Conventionally known is a machine tool adapted to rotate a tool on an axis of the tool to machine a workpiece with the tool and further adapted to automatically change the tool with another tool. As described in Japanese Patent Publication No. 52-34075, for example, this type of machine tool is constructed so as to include (a) a rotary spindle having one end for holding a tool, (b) a tool magazine for accommodating a plurality of kinds of tools, and (c) a moving device for moving the spindle along a predetermined moving path to a tool changing position where the tool held by the spindle is changed with one of the tools accommodated in the tool magazine.

In such a machine tool, breakage of the tool sometimes occurs. It is therefore necessary to detect the breakage and exchange the broken tool with another tool. The machine tool described in the above citation is provided with a breakage detecting device for detecting the breakage of the tool after the end of machining.

In this machine tool having the breakage detecting device, the spindle holding the tool is adapted to be rotated on its horizontally extending rotation axis and moved in a vertical direction. The workpiece is fixedly positioned on a table movable in a first direction parallel to the rotation axis of the spindle and a second direction perpendicular to the first direction in the same horizontal plane. Accordingly, the workpiece is desirably machined by the movements of the spindle and the table. The breakage detecting device is provided on the table, at an end portion thereof, on the spindle side. The breakage detecting device includes a sensor arm mounted on the table so as to be swingable on an axis parallel to the rotation axis of the spindle, a sensing element provided at one end of the sensor arm so as to be movable in a direction parallel to the swing axis of the sensor arm, a spring for biasing the sensing element toward the tool, and a limit switch adapted to be operated by retraction of the sensing element.

During machining of the workpiece, the sensor arm is kept in a retracted position where it extends horizontally, while upon detection of the breakage, the sensor arm is swung to a detecting position where it extends vertically. Further, upon detection of the breakage, the spindle is raised to a position where the tool held by the spindle is aligned with the sensing element of the sensor arm swung to the detecting position. In this condition, the sensing element is advanced toward the tool by -moving the table. The amount of movement of the table is set according to the length of the tool. If the tool is not broken, the sensing element comes into contact with the tool, and is then retracted to operate the limit switch, thereby judging a breakage has not occurred. On the other hand, if the tool is broken, the sensing element is not retracted, and the limit switch is accordingly not operated, thereby judging a breakage has occurred.

In the above breakage detecting device, however, it is necessary, for detecting the breakage, to swing the sensor arm, move the tool to the position opposed to the sensing element and, then, move the sensing element in the direction parallel to the rotation axis of the tool. Thus, much time is required for the breakage detection.

SUMMARY OF THE INVENTION

It is accordingly, an object of the invention to provide a tool breakage detecting method which can quickly detect breakage of a tool.

According to the invention, there is provided in a machine tool, including a spindle adapted to be moved for changing of tools along a moving path including at least an axial moving path parallel to a rotation axis of the spindle, a tool breakage detecting method comprising the steps of locating a breakage detecting device having a sensing element movable in a direction intersecting the axial moving path under the condition where a position of the breakage detecting device in a direction parallel to the axial moving path is unchanged; stopping the spindle in the course of movement of the spindle along the axial moving path for changing of the tools, at a position where a tip portion of the tool held by the spindle is to be located at an intersection between a locus of movement of the sensing element and the axial moving path, if the tool held by the spindle is not broken; moving the sensing element from a position remote from the axial moving path to a position where the sensing element is to come into contact with the tip portion of the tool if the tool held by the spindle is not broken; and judging that the tool held by the spindle is broken if the sensing element does not come into contact with the tip portion of the tool.

In the tool breakage detecting method described above, the detection of breakage of the tool held by the spindle is carried out in the course of movement of the spindle to a tool changing position.

The breakage detecting device is located under the condition where the position of the breakage detecting device in the direction parallel to the axial moving path of the spindle is unchanged. If the sensing element comes into contact with the tip portion of the tool held by the spindle during the movement of the sensing element in the direction intersecting the axial moving path, it is judged that the tool held by the spindle has not been broken. If the tool has been broken, the tip portion of the tool is necessarily lost. Therefore, the occurrence of the breakage of the tool can be detected by judging that the sensing element does not come into contact with the tip portion of the tool.

If a stop position of the spindle upon detection of a breakage, is fixed, a position of the tip portion of the tool held by the spindle at this stop position varies according to the length of each of the plural kinds of tools. Accordingly, there is a possibility that the sensing element will not come into contact with the tip portion of the tool in spite of the fact that the tip portion of the tool is not broken. Conversely, there is a possibility that the sensing element will come into contact with the remaining portion of the tool in spite of the fact that the tip portion of the tool is broken. Thus, the breakage of the tool cannot be reliably detected. According to the invention, however, the spindle is adapted to be stopped "at a position where the sensing element is to come into contact with the tip portion of the tool held by the spindle if the tool held by the spindle is not broken." That is, the stop position of the spindle upon detection of breakage is varied according to the length of the tool.

Therefore, the breakage of the tool can be reliably detected irrespective of its length.

As described above, breakage detection of the tool is carried out in the course of movement of the spindle for changing of the tools, that is, by using the axial movement of the spindle to the tool changing position. Therefore, no extra movement of the spindle for breakage detection is needed to quickly perform breakage detection.

Further, the sensing element is moved in the direction intersecting the axial movement path of the spindle so as to detect the breakage of the tool held by the spindle. Therefore, the direction of movement of the sensing element for breakage detection may be the same as that for retraction from the machining of the tool. Furthermore, since the position of the breakage detecting device in the direction parallel to the axial moving path is unchanged, the structure of a moving device for moving the sensing element can be simplified.

In addition, it is unnecessary to move the sensing element along the axial moving path as in the prior art device mentioned above. Accordingly, the breakage detection can be started immediately after the tool is moved away from the workpiece and the space necessary for breakage detection can be reduced.

BRIEF DESCRIPTION OF THE DRAWINGS

The invention will be described with reference to the drawings, in which.

DETAILED DESCRIPTION OF THE PREFERRED EMBODIMENTS

There will now be described in detail a preferred embodiment according to the invention, with reference to the drawings, wherein it is applied to detection of breakage of a tool in an NC tapping machine.

Figure 4:
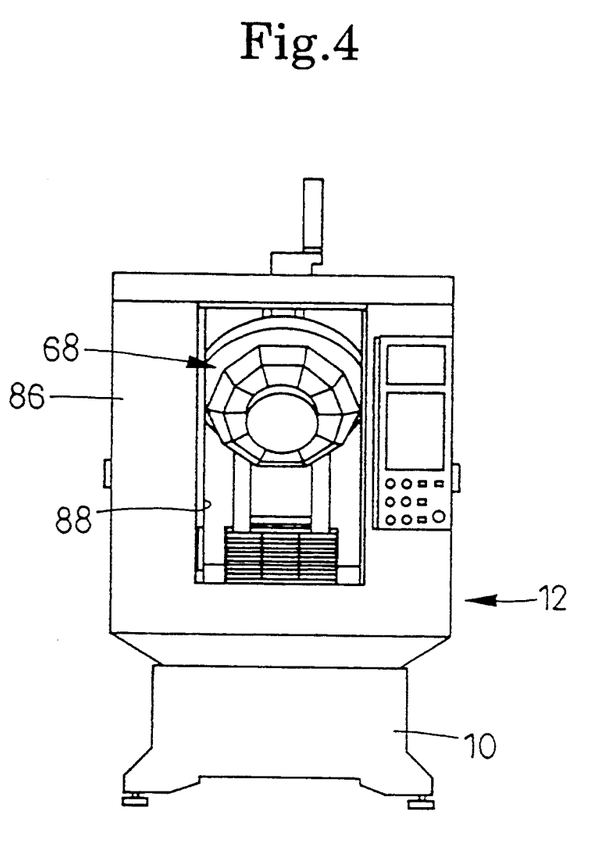
FIG. 4 is a front elevation of the NC tapping machine.
Figure 5:
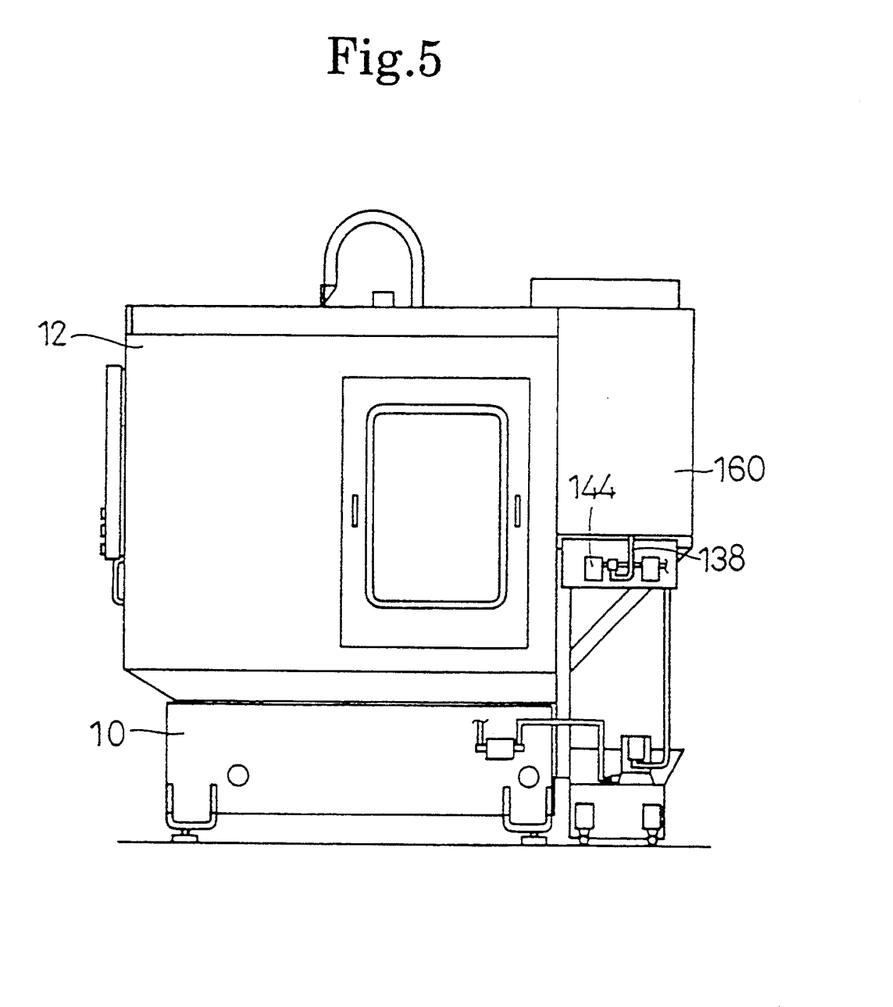
FIG. 5 is a side elevation of the NC tapping machine.
Figure 7:
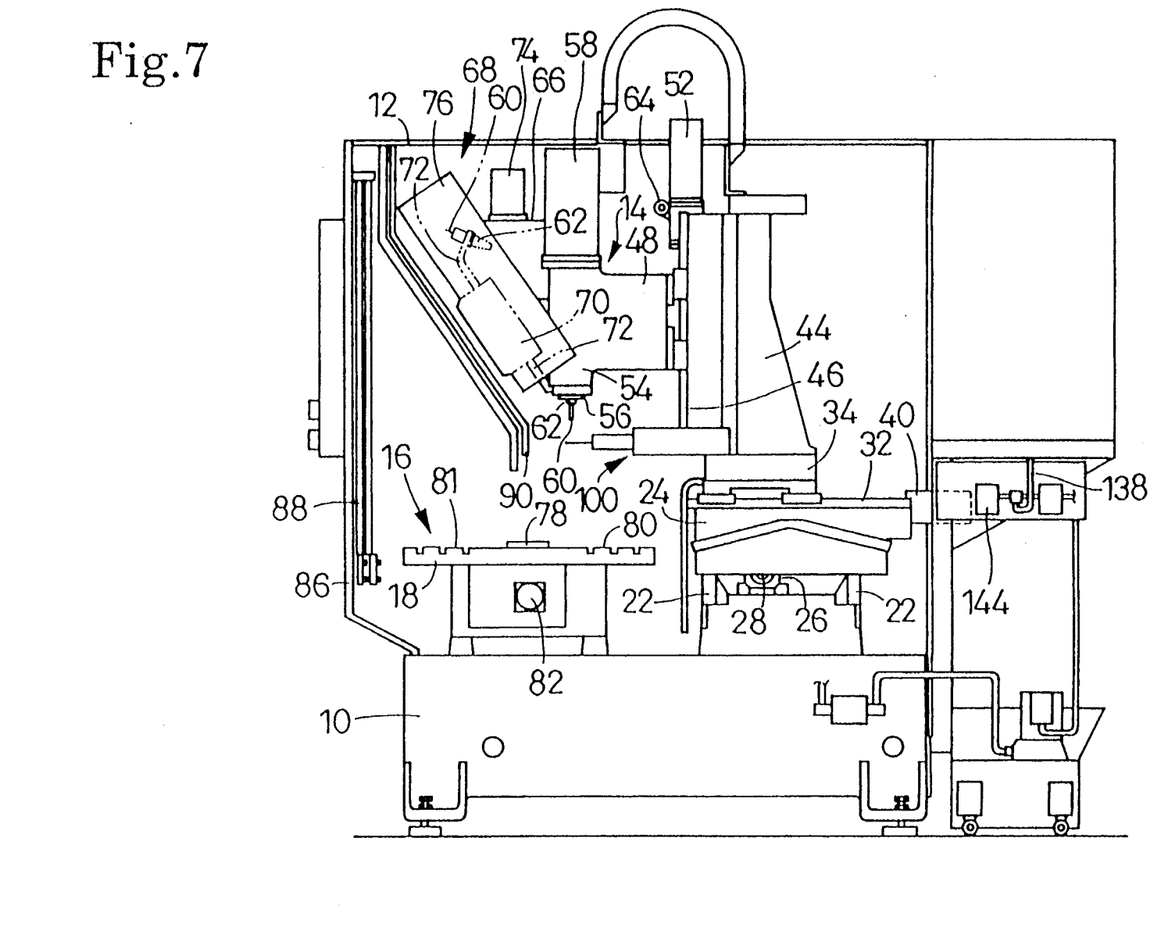
FIG. 7 is a side elevation of the NC tapping machine with the housing removed.

Referring to FIGS. 4 and 5, reference numeral 10 designates a base of the NC tapping machine. A housing 12 is mounted on the base 10. As shown in FIG. 7, a spindle head 14 and a 0°/180° rotation workpiece table unit 16 (which will be hereinafter referred to simply as a workpiece table unit 16) are provided in the housing 12. A tool is held by the spindle head 14, and a workpiece is positioned on a workpiece table 18 of the workpiece table unit 16 so that the workpiece, positioned on the workpiece table 18, is machined by the tool held by the spindle head 14.

As shown in FIG. 7, a pair of guide rails 22 extending in an X-axis direction (i.e., a direction perpendicular to the plane of the drawing sheet) are provided on the base 10 to slidably support an X-axis slide 24. A nut 26 is fixed to the X-axis slide 24 and a ball screw 28 is threadedly engaged with the nut 26. The ball screw 28 can be rotated by a X-axis direction driving motor 30 (see FIG. 8), thereby moving the X-axis slide 24 in the X-axis direction.

Figure 6:
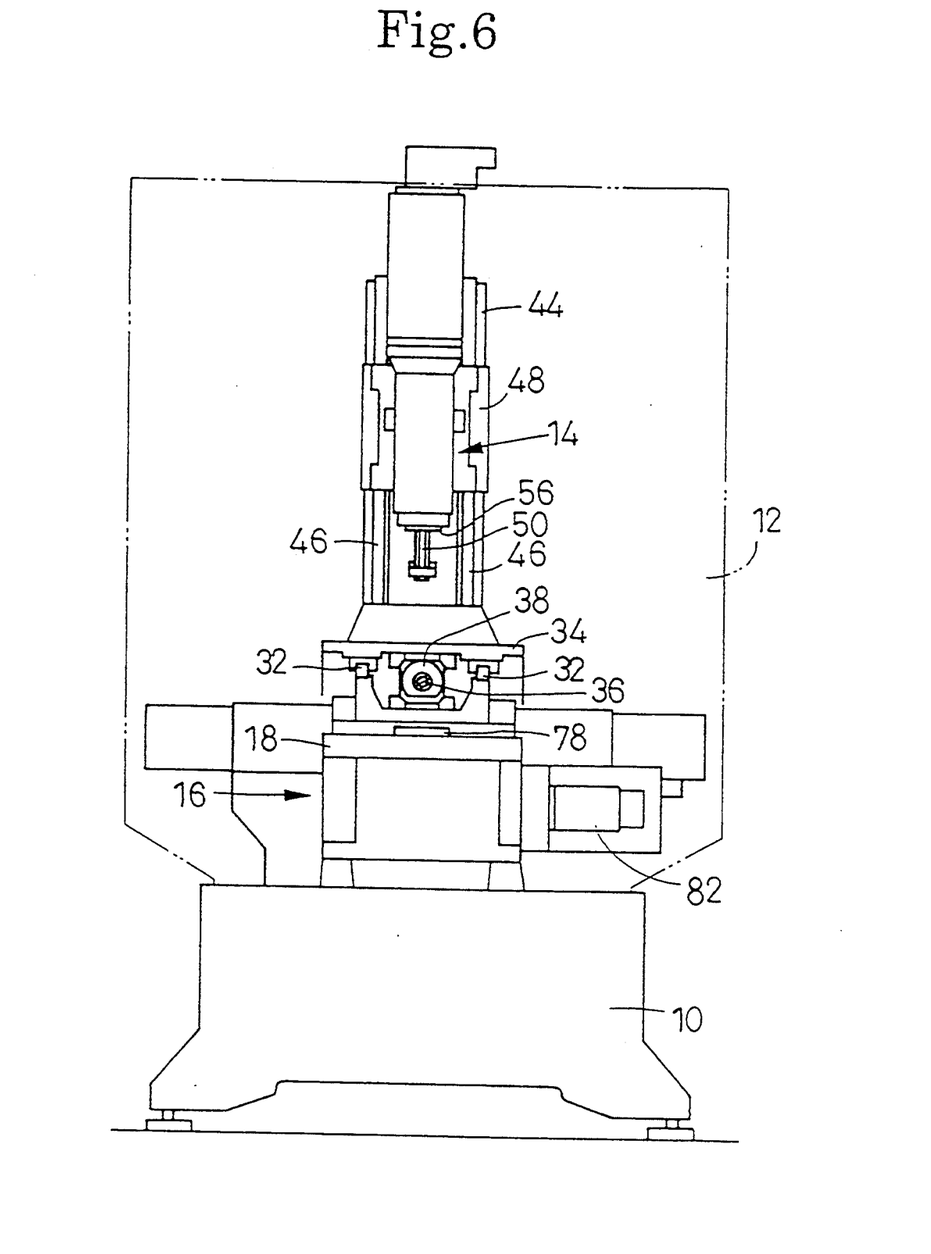
FIG. 6 is a front elevation of the NC tapping machine with a housing thereof removed.

A pair of guide rails 32 extending in a Y-axis direction (i.e., a lateral direction as viewed in FIG. 7) perpendicular to the X-axis direction in a horizontal plane are provided on the X-axis slide 24 to slidably support a Y-axis slide 34. As shown in FIG. 6, a nut 38 is fixed to the Y-axis slide 34 and a ball screw 36 is threadedly engaged with the nut 38. The ball screw 36 can be rotated by a Y-axis direction driving motor 40 (see FIG. 7), thereby moving the Y-axis slide 34 in the Y-axis direction.

A column 44 is provided on the Y-axis slide 34. A pair of guide rails 46 (see FIG. 6) extending in a Z-axis direction (i.e., a vertical direction) is provided on the front surface of the column 44 to slidably support a Z-axis slide 48. A nut (not shown) is fixed to the Z-axis slide 48 and a ball screw 50 is threadedly engaged with the nut. The ball screw 50 can be rotated by a Z-axis direction driving motor 52 (see FIG. 7), thereby moving the Z-axis slide 48 in the Z-axis direction.

The spindle head 14 is mounted on the Z-axis slide 48. A body 54 of the spindle head 14 is formed integrally with the Z-axis slide 48. A spindle 56 is supported in the body 54 of the spindle head 14 so as to be rotatable about a vertical axis parallel to the Z-axis direction. The spindle 56 is adapted to be rotated by a spindle driving motor 58. Further, the spindle 56 is movable in a direction parallel to its rotation axis by the movement of the Z-axis slide 48. A draw bar (not shown) is provided in the spindle 56 and a pull stud (not shown) is provided at a rear end portion of a tool holder 62 for holding a tool 60. The draw bar engages the pull stud to draw the tool holder 62 into the spindle 56 and fix the tool holder 62 to the spindle 56.

The drawing of the tool holder 62 by the draw bar and the releasing of the tool holder 62 from the draw bar are effected by a draw bar driving cam mechanism having a cam (not shown) provided in the Z-axis slide 48 and the body 54 and a cam follower 64 mounted on the Z-axis driving motor 52. That is, the spindle 56 is raised or lowered by the movement of the Z-axis slide 48 and in response thereto, the cam comes into engagement with or disengages from the cam follower 64, thereby releasing a clamping force applied through the draw bar to the tool holder 62 upon raising of the spindle 56 or applying the clamping force through the draw bar to the tool holder 62 upon lowering of the spindle 56. This structure is the same as that described in U.S.

Pat. No. 4,835,838, the disclosure of which is incorporated by reference.

As shown in FIG. 7, a frame 66 is fixed to the front surface of the column 44 and a tool magazine 68 is mounted to the frame 66. The tool magazine 68 is located on the front side of the spindle head 14, and has a rotating member 70, mounted to the frame 66, so as to be rotatable on an axis intersecting the rotation axis of the spindle 56. Grip arms 72 for respectively holding ten tool holders 62 are pivotably mounted to the rotating member 70 so as to be arranged at angularly equal intervals. The rotating member 70 is adapted to be intermittently rotated by a barrel cam unit (not shown) to be driven by an index motor 74, thereby sequentially bringing the ten grip arms 72 to a tool changing position which is the lowest position. The rotating member 70 and the grip arms 72 are surrounded by a cover 76 fixed to the frame 66.

Each grip arm 72 is adapted to be pivoted by a tool changing cam unit including two cam followers mounted on the grip arm 72 and a cam mounted on the body 54 of the spindle head 14, thereby effecting a change of the tools 60 between the grip arm 72 and the spindle 56. That is, when the spindle 56 is raised, grip arm 72 is brought into engagement with the tool holder 62, held by the spindle 56, and the clamped condition of the tool holder 62 provided by the draw bar is released. Thereafter, when the spindle 56 is further raised, the tool holder 62 comes out of the spindle 56. After the spindle 56 is further raised to reach its upper limit position, the rotating member 70 is rotated to bring a second grip arm 72 holding a second tool holder 62 to the tool changing position. Thereafter, when the spindle 56 is lowered, the second grip arm 72 is pivoted to bring the second tool holder 62 to a position where the second tool holder 62 can be engaged into the spindle 56. When the spindle 56 is further lowered, the second tool holder 62 is brought into engagement with the spindle 56 and is clamped by the draw bar. Then, the second tool holder 62 is released from the second grip arm 72. This structure is also the same as that described in U.S. Pat. No. 4,835,838.

In this manner, the exchange of the tools 60 is carried out by the vertical movement of the spindle 56, that is, by the movement of the spindle 56 in an axial direction parallel to its rotation axis. In the course of the axial movement of the spindle 56, the tool changing position is defined as from the position where the grip arm 72 starts to be pivoted to grip the tool holder 62 held by the spindle 56 to the position where the tool holder 62 is released from the spindle 56. Further, the Z-axis slide 48, the ball screw 50 and the Z-axis direction driving motor 52 constitute a moving device for moving the spindle 56 to the tool changing position.

A mechanical origin of the spindle head 14 in the Z-axis direction is preliminarily set. That is, the origin is set between a lower limit position and an upper limit position of the spindle head 14. Machining to the workpiece is carried out in a region lower than the origin, and changing of the tools is carried out primarily in a region higher than the origin.

As shown in FIG. 7, the workpiece table unit 16 is provided on the base 10 at a position opposing the spindle head 14. The workpiece table 18 of the workpiece table unit 16 is rotatable on a vertical axis of a shaft 78. The workpiece table 18 is rectangular and longitudinal opposite end portions of the workpiece table 18 are formed as workpiece mounting portions 80 and 81. The workpiece mounting portions 80 and 81 are constructed so that jigs capable of positioning workpieces may be fixed to the portions 80 and 81 or the workpieces may be directly fixed in position to the portions 80 and 81. The workpiece table 18 is adapted to be rotated 180° by a table driving motor 82, thereby alternatively positioning either the workpiece mounting portion 80 or 81 just under the spindle head 14. In this condition, the spindle 56 is moved three-dimensionally by the X-axis slide 24, the Y-axis slide 34 and the Z-axis slide 48 to allow the tool 60 to machine the workpiece which can be set on either workpiece mounting portion 80 or 81.

A door 88 is provided on a front wall 86 of the housing 12 surrounding the spindle head 14, the workpiece table unit 16 and the tool magazine 68, so that the door 88 is opened to allow an operator to change the tools 60 held in the tool magazine 68 or change the workpieces fixed directly or through the jigs to the workpiece table 18. Further, a cover 90 is openably provided just before the tool magazine 68 and behind the door 88.

Figure 1:
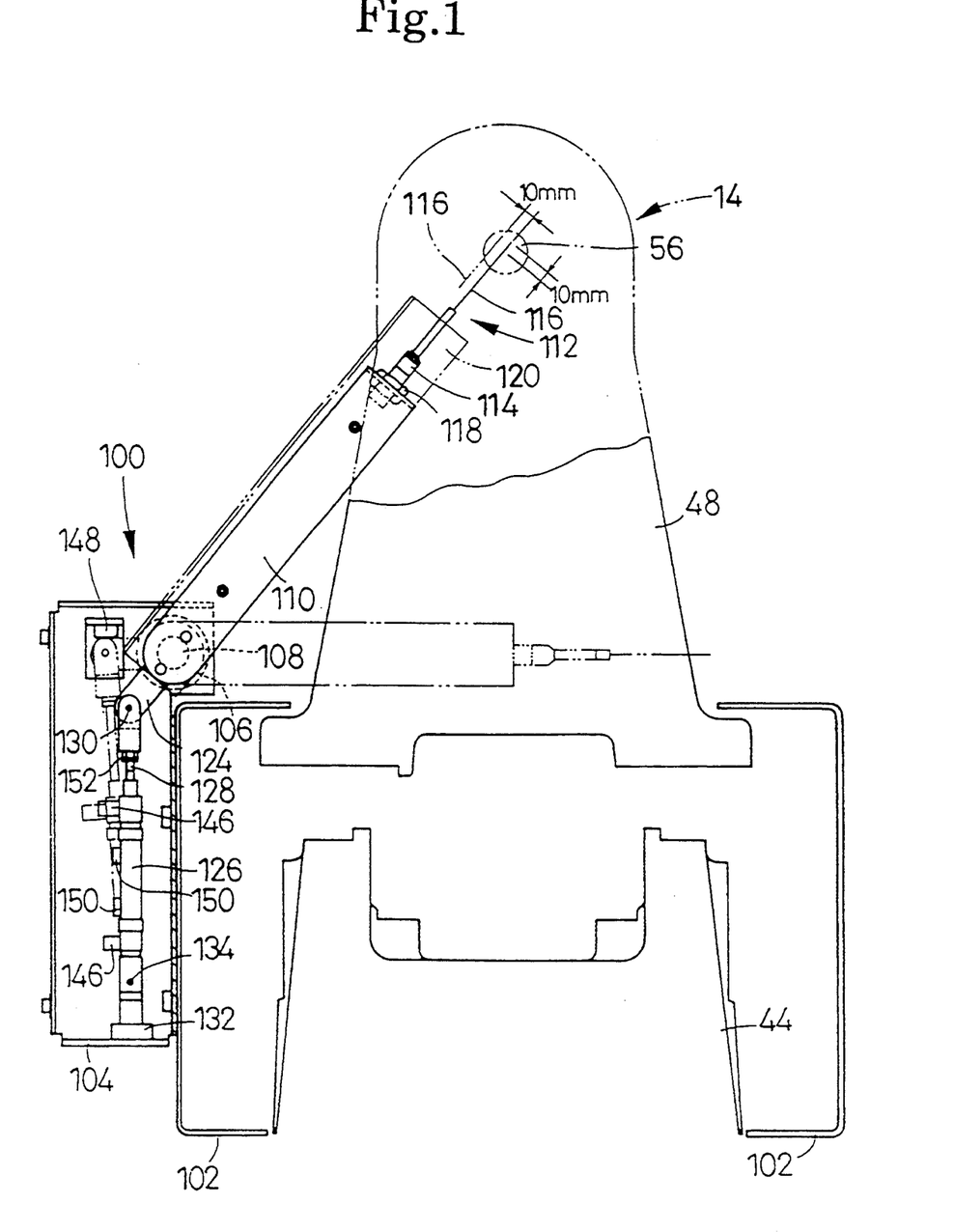
FIG. 1 is a plan view of a breakage detecting device provided in an numerical control (NC) tapping machine to which a tool breakage detecting method in a preferred embodiment according to the invention is applied.

As shown in FIG. 7, the NC tapping machine in this preferred embodiment is provided with a breakage detecting device 100 for detecting breakage of the tool 60. As shown in FIG. 1, the breakage detecting device 100 is mounted on the column 44. The breakage detecting device 100 is not movable in the Z-axis direction, but is movable in the X-axis direction and the Y-axis direction together with the spindle head 14.

Figure 2:
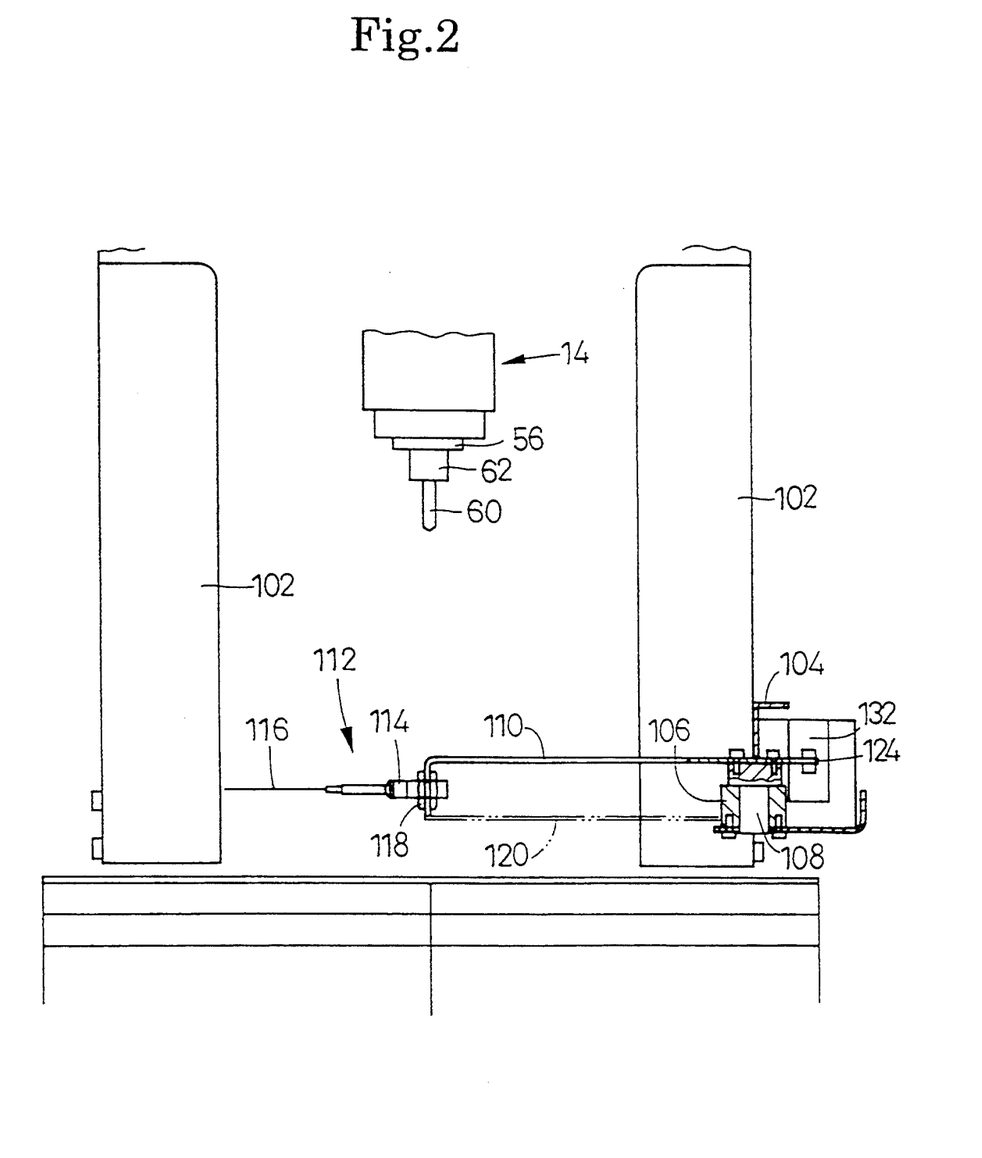
FIG. 2 is a front elevation of the breakage detecting device shown in FIG. 1.

A pair of column covers 102 are fixed to the opposite side surfaces parallel to the Y-axis direction. A bracket 104 is fixed to one of the column covers 102. The bracket 104 is formed in an L-shaped configuration as viewed in FIG. 1 such that it extends along the side surface of the column cover 102 and is turned at its front end to somewhat further extend along the front surface of the column cover 102. As shown in FIGS. 1 and 2, a boss member 106 is mounted on the bottom wall of the bracket 104 at its front end portion and a shaft 108 is engaged with the box member 106 so as to be rotatable on a vertical axis. A sensor arm 110, extending horizontally, is fixed at its base end to the upper surface of the shaft 108, and a breakage sensor 112 is mounted to the free end of the sensor arm 110.

The breakage sensor 112 comprises a body 114 and a sensing needle 116 extending from the body 114. The body 114 is threadedly engaged with an adjust nut 118 attached to the free end of the sensor arm 110. The amount of extension of the sensing needle 116 is adjustable by adjusting the amount of threaded engagement of the body 114 with the adjust nut 118. The breakage sensor 112 is a contact sensor adapted to contact an object to be detected and operate a limit switch to generate an ON signal. When the object is not detected by the breakage sensor 112, the limit switch is not operated and maintains an OFF signal. The sensing needle 116 is elastic so that even when the sensor arm 110 is swung beyond where the sensing needle 116 contacts the object, the sensing needle 116 elastically deforms and runs off the object. As shown in FIG. 1, an L-shaped cover 120 is fixed to the sensor arm 110 so as to cover the front side and lower side of the sensor arm 110 and the body 114.

A lug 124 projects from the base end of the sensor arm 110 in a direction opposite to the extending direction of the breakage sensor 112. The lug 124 is connected by a pin 130 to a front end of a piston rod 128 of an air cylinder 126 so as to be pivotable about the vertical axis of the pin 130. A mounting member 132 is fixed to the bracket 104. The air cylinder 126 is fixed by means of a pin 134 to the mounting member 132 so as to be pivotable on a vertical axis of the pin 134.

Figure 3:
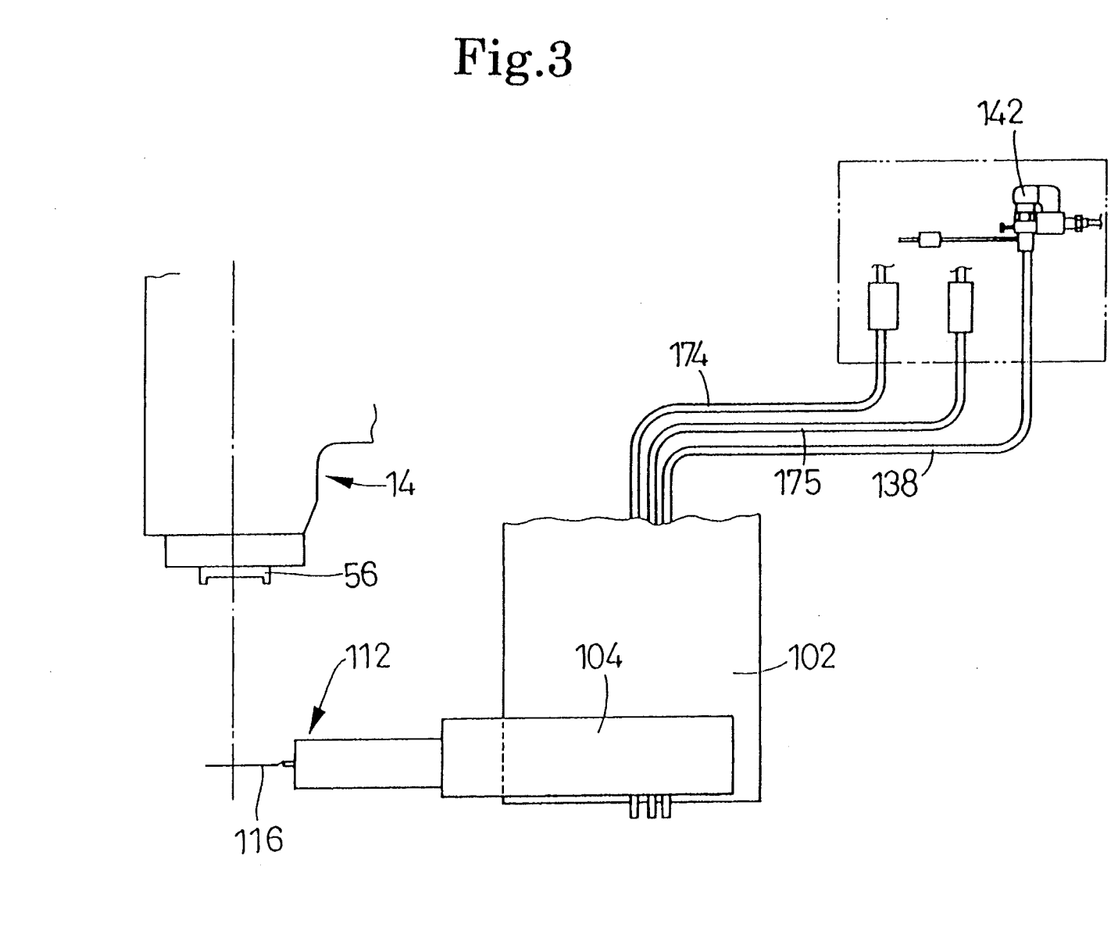
FIG. 3 is a schematic illustration of an air supply pipe connected to an air cylinder of the breakage detecting device and cables for transmitting signals from limit switches and a breakage sensor of the breakage detecting device.

The air cylinder 126 is a double acting cylinder having two air chambers. As shown in FIG. 3, the two air chambers are connected to an air source 144 (see FIG. 5) through a pipe 138 and an electromagnetic selector valve 142 mounted on the upper surface of the column 44. The air chambers can alternatively communicate with the air source or the atmosphere by operation of the electromagnetic selector valve 142. When the first air chamber in the air cylinder 126, on the mounting member 132 side, is in communication with the air source 144 and the second chamber is in communication with the atmosphere, the piston rod 128 is extended to locate the breakage sensor 112 in a retracted position as shown by a phantom line in FIG. 1. In this position, the breakage sensor 112 is oriented in parallel to the X-axis direction (i.e., a lateral direction as viewed in FIG. 1) so as not to hinder machining by the tool 60 held by the spindle 56. In contrast, when the second chamber is in communication with the air source 144 and the first chamber is in communication with the atmosphere, the piston rod 128 is contracted to swing the second arm 110, with the breakage sensor 112, and thereby move the sensing needle 116 to a detecting position, shown by a solid line in FIG. 1, in the vicinity of the rotation axis of the spindle 56.

The air cylinder 126 is provided with two swinging speed adjusters 146 for adjusting the air flow supplied to and discharged from the two air chambers to thereby adjust the expanding and contracting speed of the piston rod 128. In this preferred embodiment, the expanding and contracting speed of the piston rod 128 is adjusted so that the breakage sensor 112 takes about 1-1.5 seconds to move between the detecting and the retracted positions. Further, an expansion limit of the piston rod 128 is defined by a stopper 148. The stopper 148 is so set as to orient the breakage sensor 112 in parallel to the X-axis direction when in the retracted position. The bracket 104 is provided with two limit switches 150. When the piston rod 128 is expanded or contracted, the sensor arm 110 is swung on the vertical axis of the shaft 108 between the detecting position and the retracted position and, simultaneously, the air cylinder 126 is pivoted on the vertical axis of the pin 134. The limit switches 150 serve to detect pivotal positions of the air cylinder 126 when the piston rod 128 is moved to the expansion limit and the contraction limit.

The contraction limit of the piston rod 128 is adjusted by a cylinder knuckle 152 so that the sensing needle 116 of the breakage sensor 112 may pass beyond the rotation axis of the spindle 56 by a small distance (e.g., 10 mm in this preferred embodiment) in the swinging direction of the sensing needle 116. Further, the tip position of the sensing needle 116 is adjusted by the adjust nut 118 so as to project beyond the rotation axis of the spindle 56 by a small distance (e.g., 10 mm in this preferred embodiment) in the axial direction of the sensing needle 116.

Figure 8:
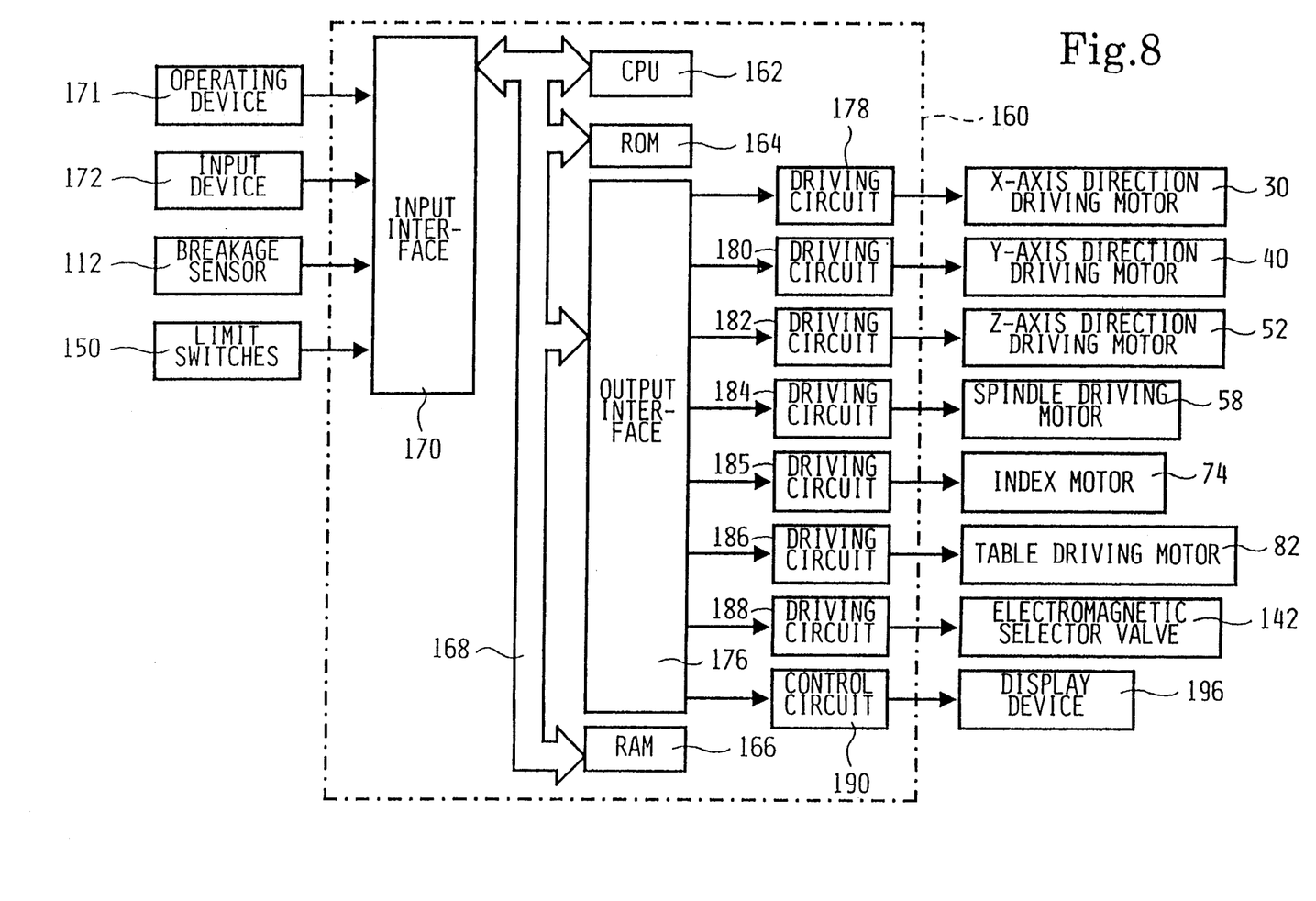
FIG. 8 is a block diagram of a control device for controlling the NC tapping machine.

The NC tapping machine in this preferred embodiment is controlled by a control device 160 as shown in FIG. 8. The control device 160 primarily comprises a computer having a CPU 162, a ROM 164, a RAM 166, and a bus 168 connecting these elements. As shown in FIG. 5, the control device 160 is provided on the rear surface of the housing 12. An input interface 170 is connected to the bus 168. Connected to the input interface 170 are an operating device 171, an input device 172, the breakage sensor 112 and the limit switches 150. The operating device 171 has a plurality of keys for inputting data such as the lengths of the tools 60 and an instruction whether or not the detection of breakage of the tools 60 is to be carried out. The input device 172 serves to input NC data (e.g., an operation program inclusive of numerical data). The NC data is read from a punched paper tape by the input device 172. The breakage sensor 112 and the limit switches 150 are connected through cables 174 and 175, as shown in FIG. 3 to the input interface 170.

Further, an output interface 176 is also connected to the bus 168. Connected to the output interface 176 through driving circuits 178, 180, 182, 184, 185, 186 and 188 and a control circuit 190 are the X-axis direction driving motor 30, the Y-axis direction driving motor 40, the Z-axis direction driving motor 52, the spindle driving motor 58, the index motor 74, the table driving motor 82, the electromagnetic selector valve 142 and a display device 196, respectively.

Figure 9:
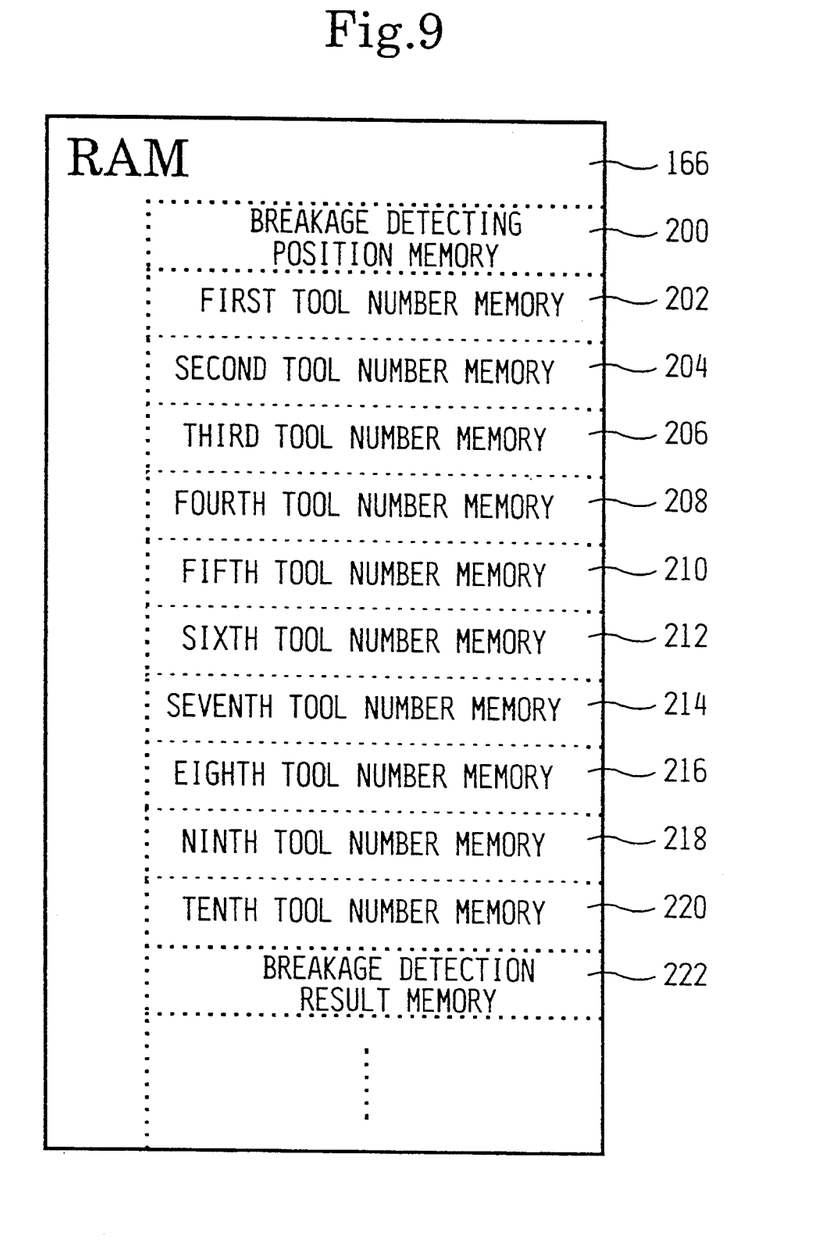
FIG. 9 is a block diagram of an essential part of a RAM in a computer which is a primary component of the control device.

As shown in FIG. 9, the RAM 166 includes a breakage detecting position memory 200, first to tenth tool number memories 202 to 220 for storing tool numbers of ten kinds of tools 60 accommodated in the tool magazine 68 in correspondence with the tool mounting positions in the rotating member 70 of the tool magazine 68, and a breakage detection result memory 222 for storing the results of detection by the breakage sensor 112.

Although not shown, the RAM 166 stores data indicative of the correspondence between the tool numbers of all the tools 60 and the lengths of all the tools 60 to be employed in this machine. The length of each tool 60 is defined as a distance from the lower end of the spindle 56 to the lower end of the tool 60 held by the spindle 56. Accordingly, the length of the tool 60 currently in use can be acknowledged by determining the tool mounting position for this tool 60 in the rotating member 70. Further, the ROM 164 stores a tool breakage detection routine shown by the flowchart in FIG. 10 and a tool change routine shown by the flowchart in FIG. 11.

Figure 12:
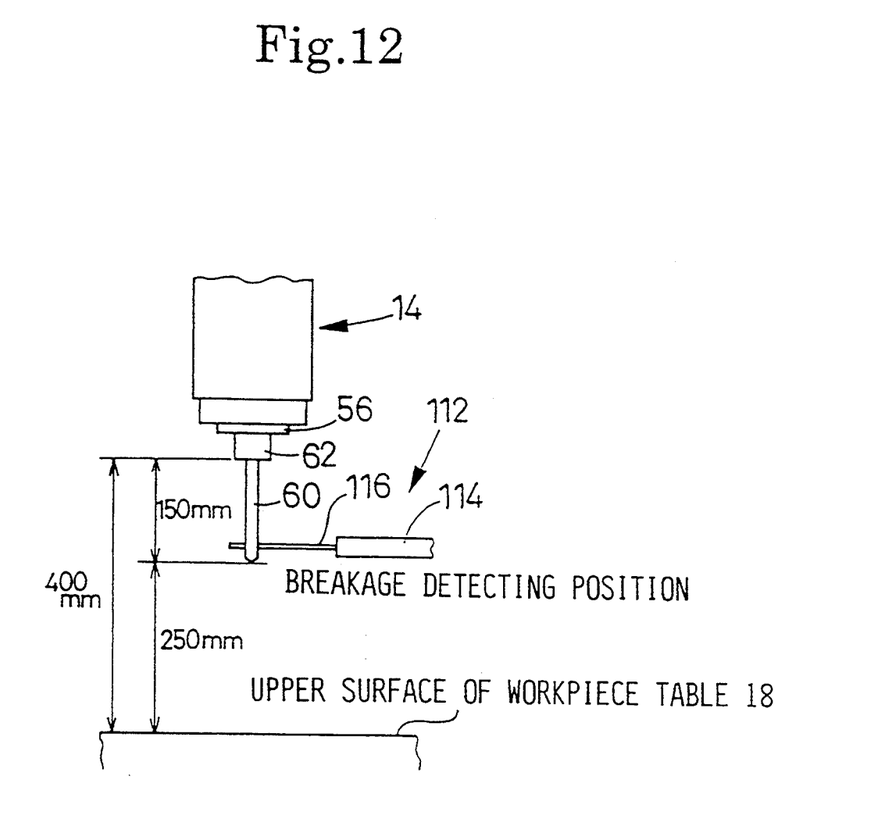
FIG. 12 is a side view illustrating setting of a breakage detecting position in detecting breakage of a tool by the breakage detecting method of the invention.

There will now be described the breakage detection of the tool 60. The breakage detection of the tool 60 is carried out in changing of the tools 60. That is, prior to start of machining, the operator first sets a breakage detecting position where the lower end of the tool 60 is to be located for detection of breakage of the tool 60. The setting of the breakage detecting position is carried out as follows. After the tool 60, having a known length, is held by the spindle 56, the manual operation mode of the machine is selected. Then, a Z-axis direction moving key of the operating device 171 is operated to move the spindle 56 in the Z-axis direction so that the lower end of the tool 60 is located at a position lower by about 10 mm than the sensing needle 116 of the breakage sensor 112 as shown in FIG. 12. Accordingly, if the tool 60 is not broken, the sensing needle 116 necessarily comes into contact with the lower end portion of the tool 60 during swinging of the breakage sensor 112 beyond the intersecting position with respect to the rotation axis of the spindle 56. Thus, if the tool 60 is not broken, this state can be surely detected. The breakage sensor 112 can be moved to the detecting position either automatically or manually.

Further, when moving the spindle 56 in the Z-axis direction, the screen of the display device 196 initially shows a "current position" screen displaying a current position of the spindle 56 in the X-axis, Y-axis and Z-axis directions, so as to acknowledge the position of the spindle 56 in the Z-axis direction. The position of the spindle 56 in the Z-axis direction is measured with respect to the position of the upper surface of the workpiece table 18 of the workpiece table unit 16, which is defined as 0. After moving the spindle 56 to the detecting position, the length of the tool 60 is subtracted from the position of the spindle 56 in the Z-axis direction by the operator. For example, if the position of the spindle 56, when it reaches the detecting position, in the Z-axis direction is 400 mm after moving the spindle 56 and the length of the tool 60 is 150 mm, a difference of 250 (=400−150) mm is obtained. The operator then selects a screen of the display device 196 that is a "parameter setting" screen and inputs the value of 250.000 (mm), obtained above, into the display column of "breakage detecting position". The input value represents a breakage detecting position, and it is stored into the breakage detecting position memory 200.

Then, if the operator directs, breakage detection of the tool 60 is performed. To instruct breakage detection, the operator selects the screen of the display device 196 designated "tool indexing" screen and sets a signal "200" in the display column of "after cutting" in an auxiliary function of the "tool indexing" screen. If a plurality of different types for tools 60 are used for machining of a single workpiece, and the breakage detection of each tool 60 is to be performed, the signal "200" is required to be set for each tool 60.

Figure 10:
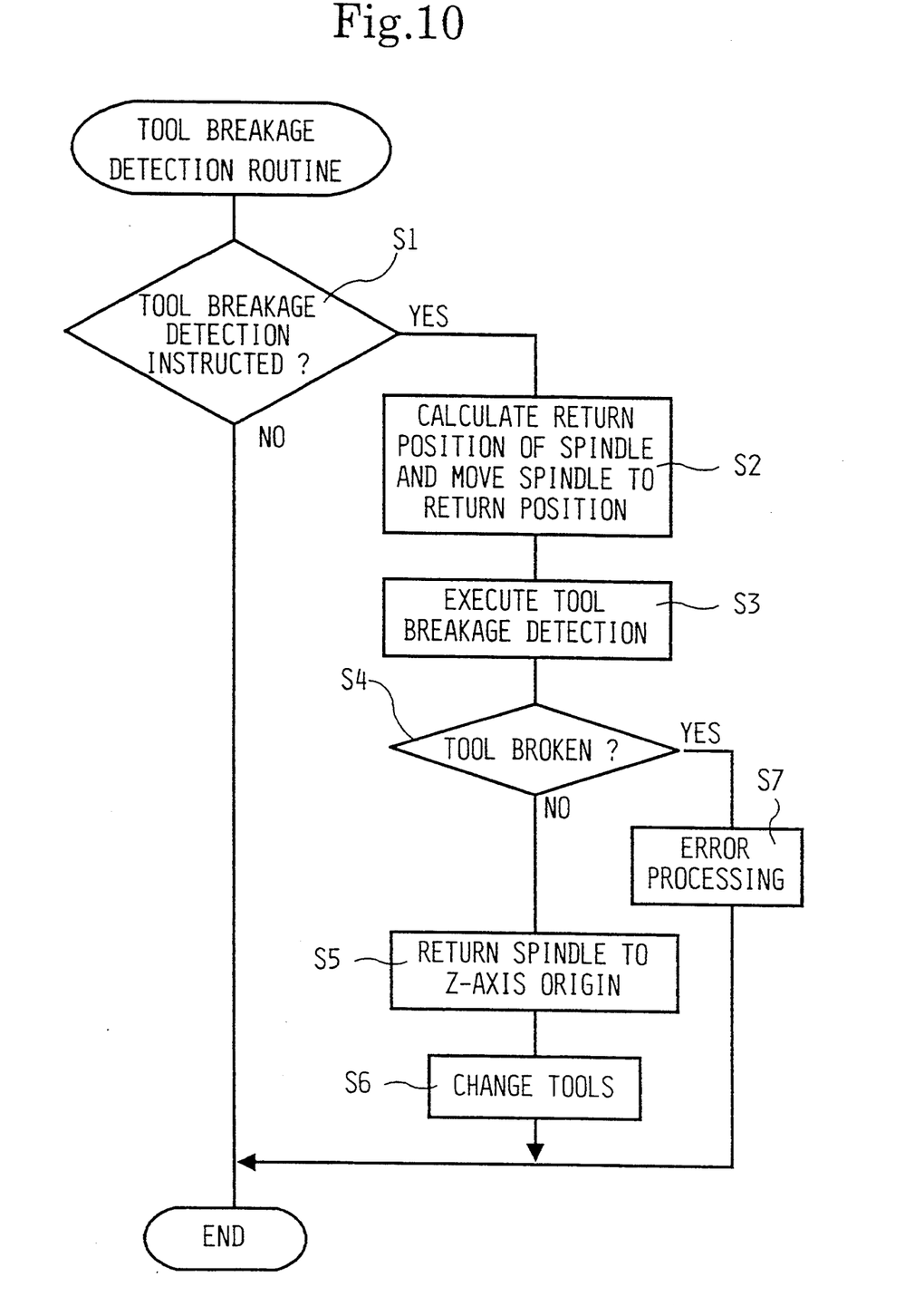
FIG. 10 is a flowchart of a tool breakage detection routine stored in a ROM in the computer.

The routine executed for breakage detection will be described in detail with reference to the flowchart shown in FIG. 10. This routine is executed every time machining by one type of tool 60 is terminated. First, in step S1, it is determined whether breakage detection of the tool 60 has been instructed. This instruction is generated if the signal "200" has been set for the tool 60 as discussed above. If breakage detection of the tool 60 has been instructed, in step S2, a position of the spindle 56 (which position will be hereinafter referred to as a return position of the spindle 56 for the breakage detection) where the lower end of the tool 60 is to be located at the breakage detecting position is calculated and the spindle 56 is moved to the return position.

The return position can be calculated by adding the length of the tool 60 held by the spindle 56 to the breakage detecting position. The kind of the tool 60 currently in use can be determined from the NC data. The length of the tool 60 currently in use is read from the RAM 166 according to the tool number of the tool 60, and the breakage detecting position is also read from the RAM 166. Then, the return position is calculated from these data read from the RAM 166. Accordingly, the return position varies according to the length of the tool 60. However, regardless of the various lengths of the tools 60, the tool 60, held by the spindle 56, is certainly moved to the breakage detecting position where the lower end portion of the tool 60 intersects the path the sensing needle 116 takes as it is swung to its detecting position if no breakage has occurred in the tool 60.

When the spindle 56 is moved to the return position and stopped, step S3 is executed. In step S3, the sensor arm 110 is swung to move the breakage sensor 112 from the retracted position to the detecting position along a locus perpendicular to the axial moving path of the spindle 56. As described above, the breakage detecting position of the tool 60 tip is set at a position lower by the small distance than the sensing needle 116 in its detecting position. Furthermore, the sensing needle 116 is adapted to pass beyond the intersection between the swing locus of the sensing needle 116 and the axial moving path of the spindle 56 and the tip position of the sensing needle 116, in its detecting position, is previously set so as to project slightly beyond the axial moving path of the spindle 56. Accordingly, if no breakage has occurred in the tool 60, the sensing needle 116 comes into contact with the lower end portion of the tool 60 and generates the ON signal, while if a breakage has occurred in the tool 60, the sensing needle 116 does not come into contact with the lower end portion of the tool 60 and maintains the OFF signal.

The ON signal and OFF signal from the breakage sensor 112 are stored in the breakage detection result memory 222 and thereafter, the breakage sensor 112 is returned to its retracted position to end the execution of step S3.

Then, the routine proceeds to step S4, in which it is determined whether a breakage of the tool 60 has occurred. That is, it is determined whether or not the ON signal has been generated from the detection sensor 112. If a breakage has not occurred, that is, the ON signal is generated from the detection sensor 112, the answer in step S4 is NO and steps S5 and S6 are executed in which changing of the tools 60 is carried out. That is, in step S5, the spindle 56 is returned to the origin in the Z-axis direction. Then, in step S6, the spindle 56 is further raised to the tool changing position and the tool 60, held by the spindle 56, is changed with one of the tools 60 accommodated in the tool magazine 68. The spindle 56 is first returned to the origin, in the Z-axis direction, to orient the spindle 56, wherein the spindle 56 is to be located at a predetermined rotational position.

If a breakage of the tool 60 has occurred, that is, the ON signal is not generated from the detection sensor 112, the answer in step S4 is YES and the system executes step S7. In step S7 the operation of the NC tapping machine is stopped and an alarm or a lamp, indicating the occurrence of the breakage, is actuated.

There has been described the case where breakage detection has been instructed. In contrast, if breakage detection has not been instructed, the answer in step is NO and the machine executes the tool change routine shown in FIG. 11.

Figure 11:
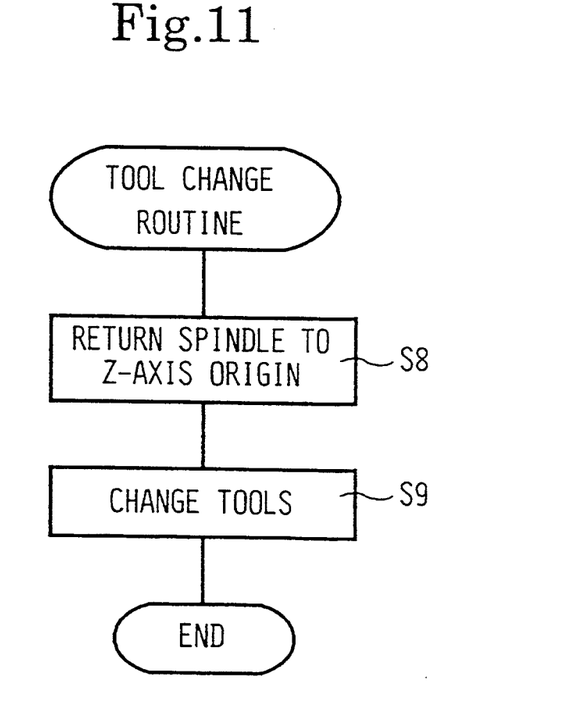
FIG. 11 is a flowchart of a tool change routine stored in the ROM.

Referring to FIG. 11, in step S8, the spindle 56 is returned to the origin in the Z-axis direction. Then, in step S9, the spindle 56 is further raised to the tool changing position and the tool 60, held by the spindle 56, is changed with one of the tools 60 accommodated in the tool magazine 68.

The breakage of the tool 60 is detected as described above. The breakage detection of the tool 60 is carried out in the course of axial movement of the spindle 56 for the purpose of changing the tools 60. Therefore, no extra movement of the spindle 56 for the purpose of detecting the breakage is needed thereby resulting in quick detection of the breakage.

Further, since the movement of the sensing needle 116 to the detecting position, where the sensing needle 116 intersects the axial moving path of the spindle 56, is effected by the swing of the breakage sensor 112, the movement of the sensing needle 116 can be easily controlled. Further, the sensing needle 116 extends a great distance from the body 114 and the tip portion of the sensing needle 116 is adapted to contact the tool 60. Therefore, even if the breakage sensor 112 is swung too far, that is, even if the body 114 is moved further after the tip portion of the sensing needle 116 comes into contact with the tool 60, there is no possibility of damage to the sensing needle 116 since an excess swing angle of the sensing needle 116 at its base end is small. Accordingly, in swinging the sensing needle 116 to the detecting position, the overall swing angle of the sensing needle 116 need not be so precise.

Further, the breakage detecting position is set as an intersection between the axial moving path of the spindle 56 and the plane of the swing motion of the sensing needle 116, so as to bring the sensing needle 116 into contact with the tool 60. Therefore, although the sensing needle 116 is thin, it can be easily brought into contact with the tool 60. If the sensing needle 116 is moved in its longitudinal direction to be brought into contact with the tool 60, the sensing needle 116 must be accurately positioned so as to extend substantially to intersect the axis of rotation of the tool 60. In particular, when the sensing needle 116 is thin, such accurate positioning of the sensing needle 116 becomes difficult.

Further, since both the spindle head 14 and the breakage detecting device 100 are provided on the column 44, a relative position between the spindle head 14 and the breakage detecting device 100 in the X-axis direction and the Y-axis direction is kept unchanged, and relative movement therebetween only in the Z-axis direction is allowed in changing the tools and detecting the breakage of the tool. Therefore, it is unnecessary to relatively position the spindle head 14 and the breakage detecting device 100 in the X-axis direction and the Y-axis direction to carry out breakage detection of the tool 60 and any breakage can be detected immediately after the machining is ended.

In the above preferred embodiment, every time the tool 60 is to be changed, it is determined whether breakage detection has been instructed and, if it has, breakage detection is carried out according to the instruction. However, breakage detection may be automatically carried out without a operator instruction every time the tool changing is carried out.

Further, although the workpiece is machined by moving the spindle head 14 in the X-axis, Y-axis and Z-axis directions in the above preferred embodiment, the machining may be carried out by moving the workpiece in at least one direction and moving the spindle head in the other directions, In the above preferred embodiment, the tool changing is effected by moving the spindle head 14 in the Z-axis direction to pivot the grip arms 72. However, a tool changing device may be provided between the spindle head 14 and the tool magazine 68. In this case, the tool 60 is changed by the tool changing device between the spindle head 14 and the tool magazine 68 under the condition where the spindle head 14 is located in a predetermined tool changing position.

In the preferred embodiment, the NC tapping machine is controlled by the control device 160 having a single computer. However, the control of the machining, the breakage detection and the workpiece table unit 16 may be carried out by a slave computer and the control of the tool magazine 68 may be carried out by another slave computer. The slave computers may be controlled by a master computer.

In the above preferred embodiment, the tool changing is carried out by moving the spindle 56 only in the Z-axis direction. However, the invention may also be applied to a machine tool of such a type that the tool changing is carried out by moving a spindle in one of the X-axis direction and the Y-axis direction or both of the X-axis direction and the Y-axis direction.

Further, it is to be understood that various modifications and improved forms may occur to those skilled in the art without departing from the spirit and scope of the invention.

What is claimed is:

1. A tool breakage detecting method in a machine tool including a rotary spindle having one end for holding a tool, a tool magazine for accommodating a plurality of different types of tools, and a moving device for moving said spindle along a moving path including at least an axial moving path parallel to a rotation axis of said spindle to a tool changing position where said tool held by said spindle is changed with one of said tools accommodated in said tool magazine, said tool breakage detecting method comprising the steps of:

locating a breakage detecting device having a sensing element movable in a direction intersecting said axial moving path under the condition where a position of said breakage detecting device in a direction parallel to said axial moving path is unchanged;

stopping said spindle in the course of movement of said spindle along said axial moving path for changing of said tools, at a position where a tip portion of said tool held by said spindle is to be located at an intersection between a locus of movement of said sensing element and said axial moving path if said tool held by said spindle is not broken;

moving said sensing element from a position remote from said axial moving path to a position where said sensing element is to come into contact with said tip portion of said tool if said tool held by said spindle is not broken; and judging that said tool held by said spindle is broken if said sensing element does not come into contact with said tip portion of said tool.

2. An apparatus for detecting breakage of a tool in a machine tool having a rotatory spindle for holding the tool, a tool magazine for holding a plurality of tools, means for moving the rotary spindle in each of three orthogonal directions where one of the directions defines a rotation axis for the rotary spindle, said apparatus comprising:

control means for controlling operation of the apparatus;

a bracket affixed to the machine tool so as to be capable of movement with the rotary spindle in two directions, the two directions defining a plane traverse to the rotation axis;

an arm pivotally mounted to said bracket and capable of movement in the plane;

a sensing needle mounted to a free end of said arm, said sensing needle describing an arc in the plane when moved to a detecting position; and input means for inputting data concerning tool length and breakage detection instructions.

3. The apparatus as claimed in claim 2, further comprising:

a boss member mounted to said bracket;

a shaft pivotally extending from said boss member and having said arm mounted thereto; and an air cylinder pivotally mounted at one end to said bracket and at another end to a second end of said arm proximate said shaft on a side of said shaft opposite said free end, said air cylinder for moving said arm from a retracted position to a detecting position.

4. The apparatus as claimed in claim 3, further comprising:
two swinging speed adjustment means for adjusting the speed with which air is input to and taken from chambers of said air cylinder; and
a stopper for limiting expansion of said air cylinder and defining the retracted position.

5. The apparatus as claimed in claim 3, further comprising a cylinder knuckle means for adjustably setting a stop position at an end of the arc beyond the detecting position.

6. The apparatus as claimed in claim 2, further comprising an adjustment means for adjusting the length by which the sensing needle extends beyond the free end of said arm.

7. The apparatus as claimed in claim 2, wherein said sensing needle is flexible.

8. The apparatus as claimed in claim 2, further comprising a sensing means electronically connected to said sensing needle and said control means for sending a signal that permits said control means to determine whether the tool has been broken.

9. A method for detecting the breakage of a tool used with a machine tool having a rotary spindle for holding the tool, a tool magazine for holding a plurality of tools, means for moving the rotary spindle in each of three orthogonal directions where one of the directions defines a rotary axis for the rotary spindle and the other two directions define a plane orthogonal to the rotary axis, the method comprising the steps of:
setting an arm having a sensing needle extending therefrom in retracted position;
moving the rotary spindle to a detecting position;
swinging the arm so that the sensing needle moves in a arc lying in the plane and passes through the rotary axis to a stop position;
determining whether the sensing needle contacts the tool; and
outputting an error signal when the sensing needle does not contact the tool.

10. The method as claimed in claim 9, further comprising the step of calculating a detecting position of the rotary spindle prior to the moving step.

11. The method as claimed in claim 9, further comprising the steps of:
inputting tool length data; and
designating tools for which breakage detection occurs automatically at the time of a tool change.

12. The method as claimed in claim 9, further comprising the steps of:
adjusting a distance the arm swings through the arc from the retracted position; and
adjusting an amount the sensing needle extends from the arm.

13. The method as claimed in claim 12, wherein the stop position is 1 to 10 mm beyond the detecting position along the arc.

14. The method as claimed in claim 12, wherein said sensing needle is adjusted to extend from 1 to 10 mm beyond the rotary axis.

15. The method as claimed in claim 1, wherein the step of moving said sensing element comprises the step of shifting said sensing element in a plane defined by two directions perpendicular to said axial moving path.

16. The method as claimed in claim 15, wherein the step of shifting said sensing element comprises the step of swinging said sensing element in an arc lying in the plane.

* * * * *